June 3, 1930.  J. F. EARLY  1,761,623

MACHINE FOR MAKING SPHERICAL GLASS BODIES

Filed March 22, 1926

Inventor
John F Early
By his Attorney
Clarence D Kerr

Patented June 3, 1930

1,761,623

UNITED STATES PATENT OFFICE

JOHN F. EARLY, OF CLARKSBURG, WEST VIRGINIA, ASSIGNOR TO THE AKRO-AGATE COMPANY, OF AKRON, OHIO, A CORPORATION OF OHIO

MACHINE FOR MAKING SPHERICAL GLASS BODIES

Application filed March 22, 1926. Serial No. 96,427.

Figure 1:
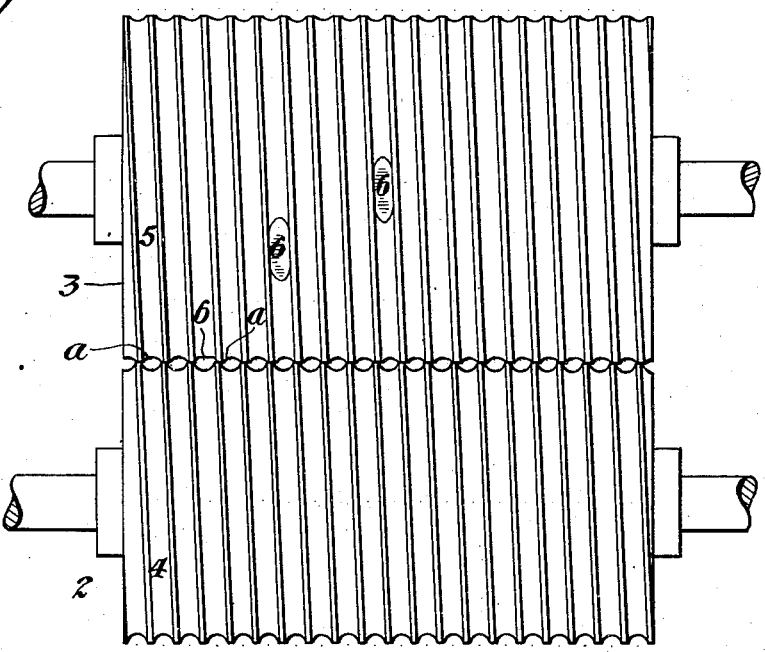
Figure 2:
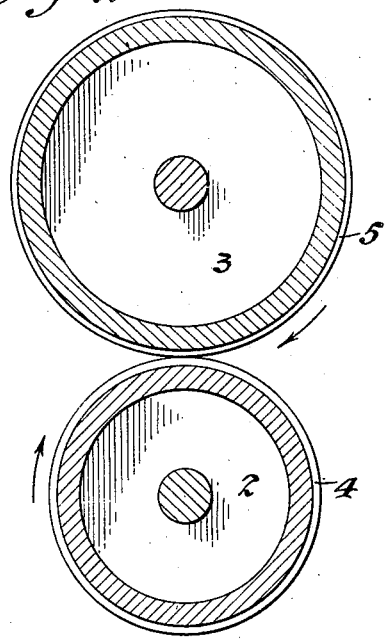
Figure 3:
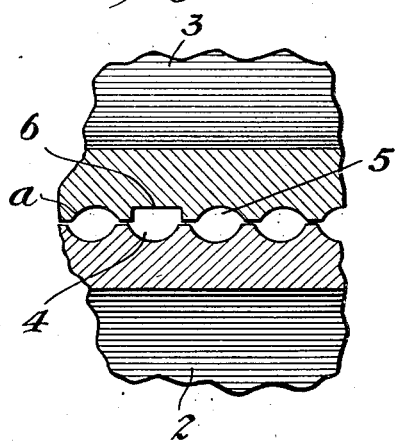

Fig. 1 is a plan of apparatus embodying my invention; Fig. 2 is a vertical section thereof; and Fig. 3 is an enlarged detailed horizontal section showing the meeting faces of the rolls.

My invention relates to machines for making spherical glass bodies, one type of which is shown in Patent No. 1,164,718 of Horace C. Hill, dated December 21, 1915.

I have found that with machines of the character shown in the Hill patent, which are largely used for the manufacture of spherical glass bodies such as marbles, and balls used for industrial purposes, sometimes the bodies are formed with flattened portions, which are caused by rotation about a substantially constant axis, whereas to form bodies in the shape of spheres it is necessary that, while plastic, they rotate about constantly changing axes.

For the purpose of overcoming this difficulty, I have so arranged the rolls that the groove in the face of one roll is so arranged with reference to the groove in the face of the opposing roll that the body being formed will bear in such a way that the marble is caused to rotate about a constantly changing axis, and to ensure the constant changing of such axis I have formed the grooves about radii of different dimensions, and have further provided means which will cause a shifting of the body being formed in the groove, so that as it advances further it must be rotated about a changed axis. My invention also comprises various features which I shall hereinafter describe and claim.

Referring to the drawings, I have shown my invention applied to a machine such as is shown in the Hill patent, in which the roll 2 rotates downwardly at its working point and the roll 3, which preferably is of larger diameter than the roll 2, rotates upwardly at its working point. The roll 2 has a helical groove 4 and the roll 3 a helical groove 5. The helical groove 5 is shallower than the groove 4, and the roll 3 is arranged with reference to the roll 2 so that the grooves 5 have a lead upon the grooves 4. The result of this is that the grooves 5 are not in register with the grooves 4, but the grooves 5 are always slighlty in advance of the grooves 4.

It will thus be seen that as a gob of glass is dropped into the grooves 4 and 5 at the receiving ends of the rolls, the gob will be engaged by the groove 5 at the point marked a, and as the gob is rotated it will bear along the bottom of the groove 4, with the result that the off-centered application of force from the groove 5 will cause it to rotate about an axis other than an axis parallel with the center of either groove, and this will cause rotation in at least two directions, which will constantly change. To provide further means for ensuring constant change of rotation of the glass body I have cut away the groove 5 of the roll 3, which moves upwardly at its working point, preferably at a number of points, and have formed recesses 6 in the groove at such points in the shape of a trough with a flattened bottom surface. As the glass body strikes this flattened surface of a recess 6 it is, of course, relieved from its engagement by the surface a and will tend to roll over upon another axis. Then, as rotation of the rolls continues, the surface a of the roll 3 will again engage the glass body and tend to rotate it about a still further axis. The first of the recesses 6 is preferably slightly removed from the receiving end of the rolls, and I have found that two or three of such recesses are sufficient for the purpose involved, and these are preferably located in the portion of the roll 3 nearest the receiving end.

I have found that in machines constructed in accordance with my invention I obtain a substantially increased proportion of bodies which are substantially spherical, with the result that with my improved machine there is practically no loss from bodies which are imperfectly shaped.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a machine for manufacturing spherical glass bodies, a pair of oppositely arranged rolls having opposing helical peripheral grooves; means for simultaneously rotating said rolls upwardly and downwardly at their respective working points; and means effective from the beginning of the formation of each article for causing the article being formed to rotate positively about constantly changing axes, said means comprising arranging the groove on the upwardly moving roll to have a lead on the groove on the downwardly moving roll.

2. In a machine for manufacturing spherical glass bodies, a pair of oppositely arranged rolls having opposing peripheral grooves; means for simultaneously rotating said rolls upwardly and downwardly at their respective working points; and flattened portions in the groove of the upwardly moving roll adapted to cause rotation of the body being formed about substantially different axes.

3. In a machine for manufacturing spherical glass bodies, a pair of oppositely arranged rolls having opposing peripheral grooves; means for simultaneously rotating said rolls upwardly and downwardly at their respective working points, the groove on the upwardly moving roll being shallower than the opposing groove, having a lead over the opposing groove, and also having flattened portions therein, all of said features in the last mentioned groove cooperating to ensure rotation of the body about constantly changing axes.

4. In a machine for manufacturing spherical glass bodies, a pair of oppositely arranged rolls having opposing peripheral grooves; means for simultaneously rotating said rolls upwardly and downwardly at their respective working points, the groove on the upwardly moving roll being shallower than the groove on the downwardly moving roll and the groove on the upwardly moving roll arranged to have a lead on the groove on the downwardly moving roll, whereby the articles being formed are caused to rotate positively about constantly changing axes and rotation about a single axis is prevented.

5. In a machine for manfacturing spherical glass bodies, a pair of oppositely arranged rolls having opposing peripheral grooves; means for simultaneously rotating the rolls upwardly and downwardly at their working points, the groove of the upgoing roll being offset in the direction of the length of the said rolls to permit the rear side of the groove of the upgoing roll to engage a body and push such body forwardly and upwardly as it is being formed, which thereby assists it in rotating positively about constantly changing axes and rotation about a single axis is prevented.

6. In a machine for manufacturing spherical glass bodies, a pair of oppositely arranged rolls having at the working point opposing peripheral grooves; lands at the sides of the grooves, said grooves being disposed out of coincidence with each other with a portion of one of the lands on one of the rolls lying directly opposite a portion of the groove on the opposite roll; means for simultaneously rotating said rolls upwardly and downwardly at their respective working points, the groove on the upwardly moving roll being shallower than the groove on the downwardly moving roll, the said opposite arrangement and the difference in depth of said grooves comprising means whereby the formation of the gob is accelerated and rotation about a single axis prevented.

JOHN F. EARLY.